(12) United States Patent
Robert

(10) Patent No.: US 7,389,690 B2
(45) Date of Patent: Jun. 24, 2008

(54) MICRO-GYROMETER WITH FREQUENCY DETECTION

(75) Inventor: Philippe Robert, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 296 days.

(21) Appl. No.: 11/202,148

(22) Filed: Aug. 12, 2005

(65) Prior Publication Data

US 2006/0032306 A1    Feb. 16, 2006

(30) Foreign Application Priority Data

Aug. 13, 2004   (FR) .................................. 04 51849

(51) Int. Cl.
*G01P 9/04* (2006.01)
(52) U.S. Cl. .................. 73/504.12; 73/504.14
(58) Field of Classification Search ............ 73/504.04, 73/504.12, 504.14, 504.16, 504.02
See application file for complete search history.

(56) References Cited

U.S. PATENT DOCUMENTS

| | | | |
|---|---|---|---|
| 5,895,850 A * | 4/1999 | Buestgens | ................ 73/504.12 |
| 6,032,531 A | 3/2000 | Roszhart | |
| 6,250,156 B1 | 6/2001 | Seshia et al. | |
| 6,487,864 B1 | 12/2002 | Platt et al. | |
| 6,843,127 B1 * | 1/2005 | Chiou | .................... 73/504.12 |
| 6,978,673 B2 * | 12/2005 | Johnson et al. | .......... 73/504.12 |
| 7,043,985 B2 * | 5/2006 | Ayazi et al. | ............. 73/504.04 |
| 2004/0154400 A1 | 8/2004 | Johnson et al. | |

FOREIGN PATENT DOCUMENTS

EP         0 507 338 A1    10/1992

OTHER PUBLICATIONS

W. Geiger, et al., The Micromechanical Coriolis Rate Sensor µCORS II, Symposium Gyro Technology, 2003, pp. 5.0-5.9.
W. Geiger, et al., The Micromechanical Coriolis Rate Sensor µCORS II, Symposium Gyro Technology, 2003, pp. 5.0-5.9.

* cited by examiner

*Primary Examiner*—Helen C. Kwok
(74) *Attorney, Agent, or Firm*—Oblon, Spivak, McClelland, Maier & Neustadt, P.C.

(57) ABSTRACT

This invention suggests a micro-gyrometer, advantageously machined using conventional micro-electronic techniques, based on the detection of Coriolis forces generated by an angular movement Ω perpendicular to the direction of vibration of the masses free to move along the plane of the gyrometer. Coriolis forces are detected through the movement that they apply to the natural mode of a resonator coupled to the moving device.

23 Claims, 4 Drawing Sheets

MICRO-GYROMETER WITH FREQUENCY DETECTION

TECHNICAL FIELD AND PRIOR ART

The invention relates to inertial sensors intended for the measurement of angular velocity or gyrometers, and more specifically micro-machined gyrometers, in other words gyrometers that form part of Micro-ElectroMechanical Systems (MEMS), and particularly flat monolithic gyrometers.

Gyrometers are used for many purposes; they are used for automobiles, aeronautics and robotics, etc. Cost is a very important aspect, in the same way as for all products used for general consumer applications like automobiles. Therefore, collective manufacturing of such components using a microelectronic technology becomes very attractive.

Gyrometers are already widely manufactured by machining of silicon wafers. For example, as described in document U.S. Pat. No. 6,250,156, this type of component 1 shown diagrammatically in FIG. 1A, typically comprises two coupled mobile masses 2, 2' that vibrate in resonance (assembled like a tuning fork) in the plane of the wafer 1 to which they are indirectly anchored. The masses 2, 2' may be excited by electrostatic forces applied through comb-type structures 3, 3' nested in the masses 2, 2'. If it is assumed that the masses vibrate along the X axis when the gyrometer 1 rotates at a given angular velocity about the Z axis (orthogonal to the X axis), the composition of the forced vibration with the angular velocity induces forces called Coriolis forces, that start the masses 2, 2' vibrating along the Y direction too, in this case perpendicular to the plane of the paper. This displacement is then detected by capacitive means 4, 4', for example electrodes placed below the mobile masses 2, 2', to return to the value of the rotation velocity about the Z axis.

According to different geometries and about another rotation axis, for example described in the document by Geiger et al ("The micromechanical Coriolis rate sensor μCORS II", *Gyro Technology symposium*, Stuttgart 2003; 5.0-5.9) and shown diagrammatically in FIG. 1B, detection can take place in the plane (X, Y) of the gyrometer 5 in which mobile masses 6 are made to vibrate, once again using the principle of capacitive detection; electrodes 7 measure the relative displacement of the masses 6 along the Y direction under the influence of an angular displacement along the Z axis and a forced vibration along X using the combs 8.

In fact, almost all silicon gyrometers are based on capacitive detection of movement generated by the Coriolis force, with the moving masses being slaved in position. However, this requires complex analog electronics, and the gyrometer sensitivity is mediocre and strongly dependent on transverse accelerations.

PRESENTATION OF THE INVENTION

The invention is designed to overcome the disadvantages mentioned above. The invention is particularly suitable for gyrometer structures according to the state of the art, in other words of the tuning fork type, for example micromechanical devices with excitation of seismic masses along an axis, and generation of Coriolis forces along a direction orthogonal to this vibration axis and to the rotation axis.

According to the invention, the influence of the Coriolis forces on another resonator associated with the mobile structure is measured, rather than using capacitive means to detect displacement of seismic masses under the effect of these forces. The natural frequency of a mechanical resonator changes under the effect of a stress, thus causing frequency modulation. Therefore the invention describes how to use this effect to measure forces derived from angular displacement orthogonal to a forced vibration.

According to one embodiment, the gyrometer according to the invention comprises a first resonator free to move in a plane and comprising two masses connected to each other by connecting means, means for putting masses into movement in a first direction in the plane, a second detection resonator connected at a first end part to the first mobile resonator, and means for measuring the natural frequency of the detection resonator. The second resonator may be fixed at a second end part to a substrate that forms part of the gyrometer, for example a microtechnological support for a flat monolithic gyrometer.

According to one preferred aspect, the invention relates to a gyrometer provided with a device that comprises two masses connected through a connecting frame, advantageously two parallel connecting arms connected to the masses by perpendicular bending arms, and that is free to move relative to a substrate, the movement being slaved by means for putting the masses into movement and more particularly to make them vibrate, advantageously in the form of capacitive combs. The gyrometer also comprises at least one (second) detection resonator connected to the mobile device at one end, and fixed at the other end. Means for exciting the detection resonator and measuring its resonant frequency are provided.

During use, the gyrometer according to the invention enables the detection of angular movements normal to its plane, by the generation of Coriolis forces perpendicular to the connecting arms, the masses being put into vibration, advantageously in resonance and in phase opposition, along the direction defined by the arms. Movements are detected in the plane of the device.

Preferably, the support is a microelectronic substrate such as monocrystalline silicon of the SOI (Silicon On Insulator) type, and the gyrometer is micromachined in the active part of this substrate, all components of the gyrometer being in a single piece so as to form a monolithic gyrometer.

The detection resonator of the gyrometer according to the invention may be in the form of a vibrating beam or a tuning fork; several resonators may be used simultaneously. Resonators may also be activated by capacitive electrodes that can be used both for activation and for detection, or can be decoupled for each function.

Connecting arms are fixed to the support through a torsion axis, advantageously at their centre, so as to transform the Coriolis force into a torque on the arm, each resonator being fixed to a connecting arm at an offset from this torsion axis; the stress on the detection resonator, and therefore the change in its natural mode, may thus be increased, particularly when the detection resonator is close to the torsion axis.

The detection resonator may also be used with other amplification means such as articulated rigid arms.

BRIEF DESCRIPTION OF THE DRAWINGS

The attached figures will help to better understand the invention, but are only given as illustrations and are in no way restrictive.

DETAILED PRESENTATION OF PARTICULAR EMBODIMENTS

Figure 1A:
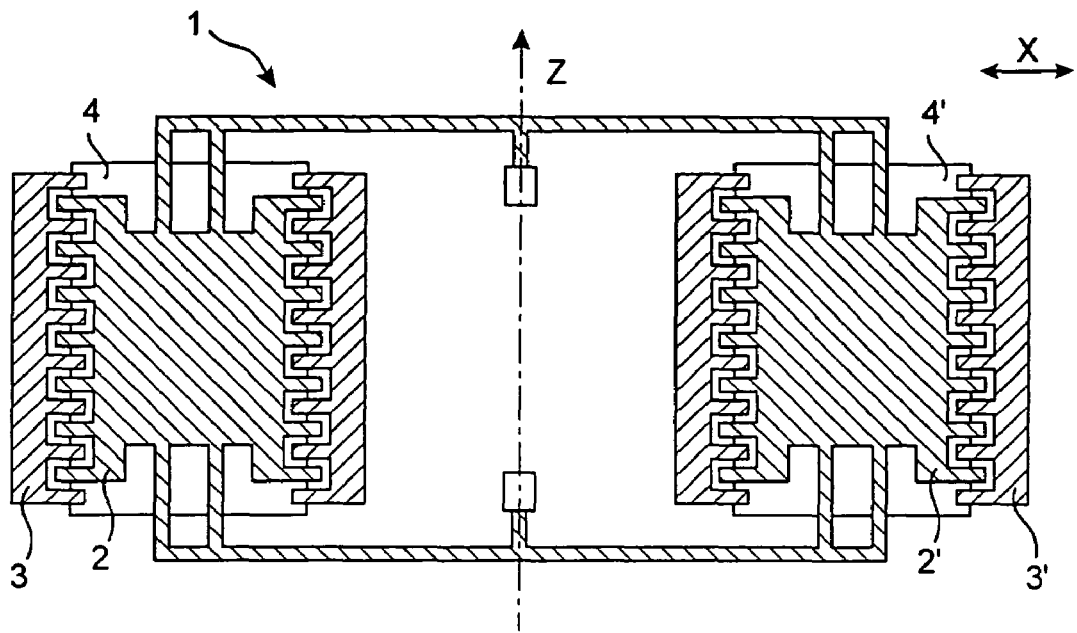
FIGS. 1A and 1B, already described, show gyrometers according to the state of the art.
Figure 1B:
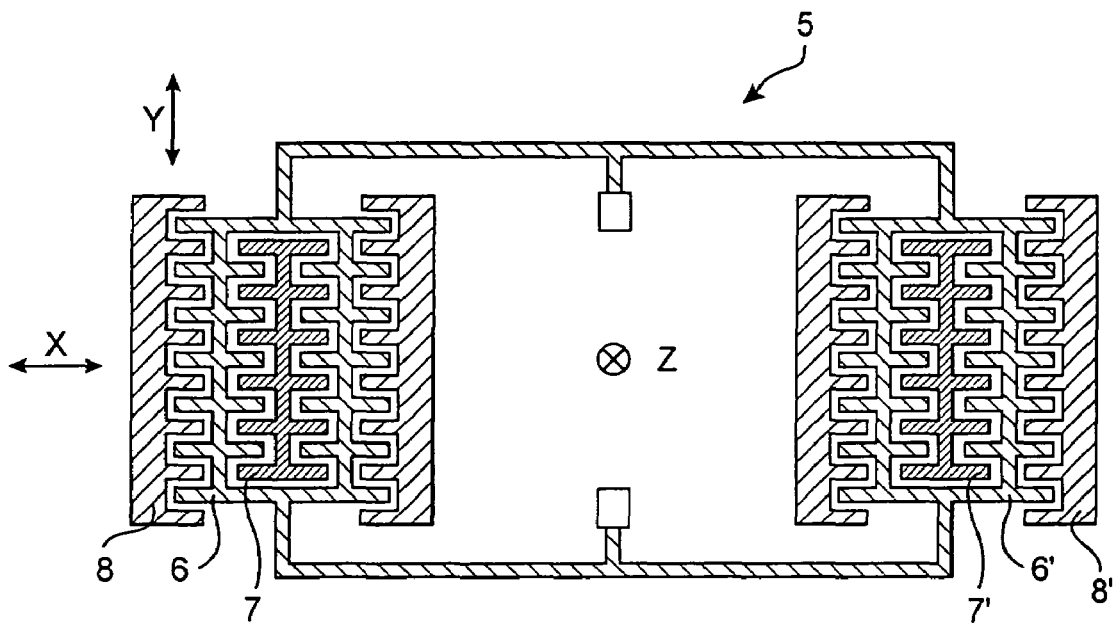
Figure 2:
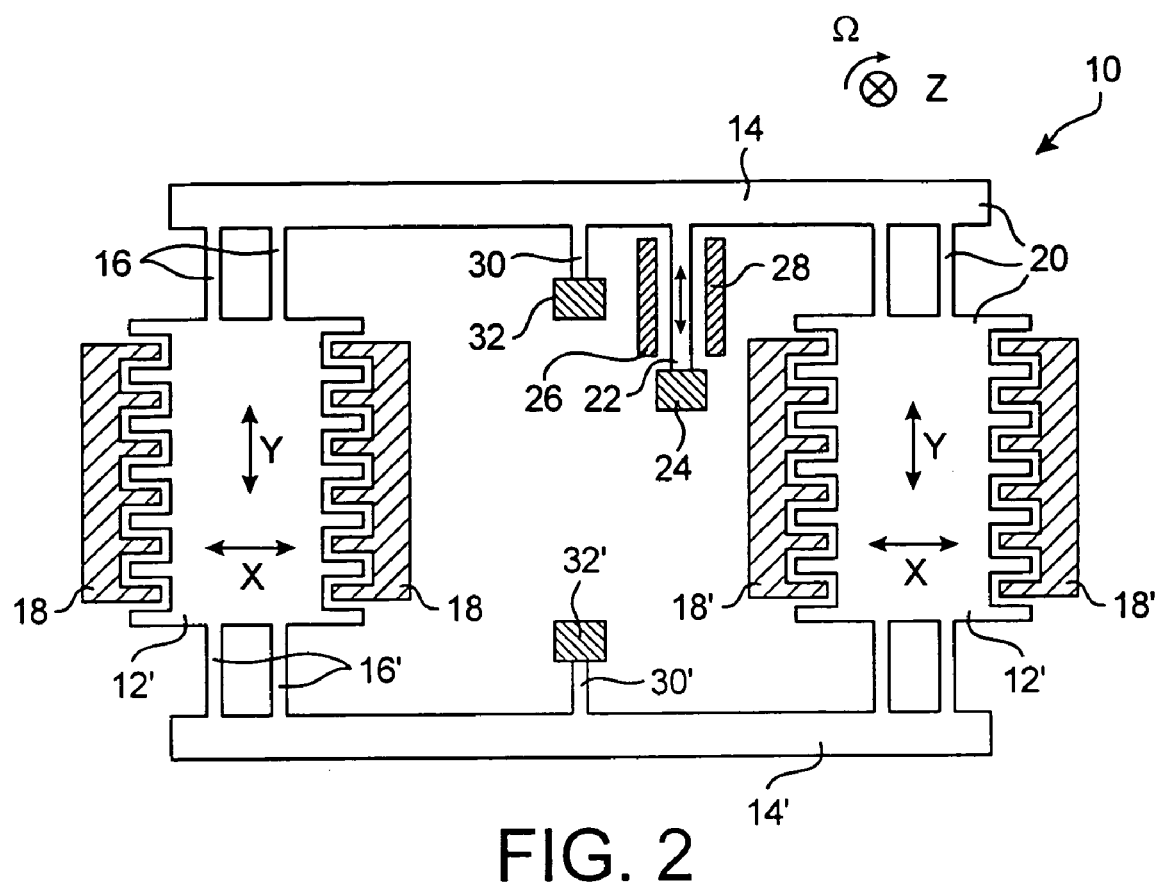
FIG. 2 shows a gyrometer according to one embodiment of the invention.

As shown diagrammatically in FIG. 2, the gyrometer 10 according to the invention is composed of a support (not shown), and two seismic masses 12, 12' that are free to move in the (X, Y) plane of the support, and that in particular are free to vibrate. The two masses 12, 12' are coupled by connecting means, also free to move with respect to the support. In the frame shown, two connecting arms 14, 14', parallel in this case, are connected to the mobile masses through means 16, 16' that are sufficiently flexible to enable relative movements of two masses 12, 12' with respect to the arms 14, 14', while being sufficiently rigid to transmit movements of masses 12, 12' to the arms 14, 14', as will become clear later in the description. Preferably, the connecting arms 14, 14' and the flexible means or bending means 16, 16' form a rectangular frame; the flexible means 16, 16' may for example be bending springs or an attachment tab.

Means for putting masses 12, 12' into vibration in the (X, Y) plane of the support are provided, for example excitation combs 18, 18' nested in one or both faces of each mobile mass 12, 12'. The combs 18, 18' generate a back and forth displacement of each mass 12, 12' along a first direction X, in this case from the left to the right of the paper, by electrostatic forces; other means such as electromagnetic excitation could also be provided.

In particular, the masses 12, 12' are excited, preferably at or close to resonance, by electrostatic forces applied through "interdigitised" comb structures 18, 18'; all masses 12, 12' and connecting means 14, 14', 16, 16' thus form a first excitation resonator 20. Operation at resonance gives a high displacement amplitude and a high quality factor, thus increasing the sensitivity of the gyrometer. Advantageously, the vibration of the masses 12, 12' is in phase opposition, in other words they are moving in opposite directions at all times; the distance separating the two masses 12, 12' is variable, this variation being tolerated by the flexible means 16, 16'. This enables detection by second resonators.

When an angular displacement is applied to the gyrometer 10 about a Z axis perpendicular to the support, a Coriolis force is generated on each mass 12, 12' perpendicular to the X and Z axes and therefore in this case along the vertical direction Y of the sheet, originating from the composition of the vibration forced by elements 18, 18' with the angular velocity Ω. The Coriolis forces are transmitted to the arms 14, 14' through flexible means 16, 16'; if a second resonator 22 is coupled to an arm 14, a stress generated by the Coriolis force is also applied to this resonator.

This stress shifts the resonant frequency ϖ of the detection resonator 22. The rotation velocity Ω about the Z axis is then deduced from the measured frequency shift δϖ. In particular, the resonator 22 is preferably excited and slaved at or close to its resonant peak; a digital electronic system makes it easy to return to the resonant frequency at any time.

Due to its connection to the connecting arm 14, 14' rather than to a mobile mass 12, 12', the detection resonator 22 is also less disturbed by movements of the mass 12, 12' and it has a better sensitivity.

For example, the resonator 22 may be in the form of a vibrating beam like that shown diagrammatically in FIG. 2, a first end of which is connected to the connecting arm 14 and the other end is anchored to the substrate by any known means 24. According to one preferred embodiment, the resonator 22 is excited in resonance by capacitive means consisting of fixed electrodes that are also used for detection. There can also be a detection electrode 26 dissociated from the excitation electrode 28. An electromagnetic excitation, or detection by an piezoelectric gauge, could also be envisaged.

A torsion axis 30, 30', designed to transform Coriolis forces applied to masses 12, 12' into a torque about this torsion axis 30, 30' by a "lever arm" effect that applies the highest possible stress onto the resonator 22, is advantageously located on each arm 14, 14', so as to increase the maximum detection and the sensitivity of the resonator 22.

Each of these torsion axes 30, 30' is thus attached at one end to the support by an anchorage 32, 32' and at the other end to the connecting arm 14, 14', along their centre line. As shown diagrammatically, the anchors 32, 32' are advantageously arranged inside the rectangular frame 14, 14', 16, 16', towards the centre of the structure 20, to limit temperature drifts of the gyrometer 10.

Figure 3:
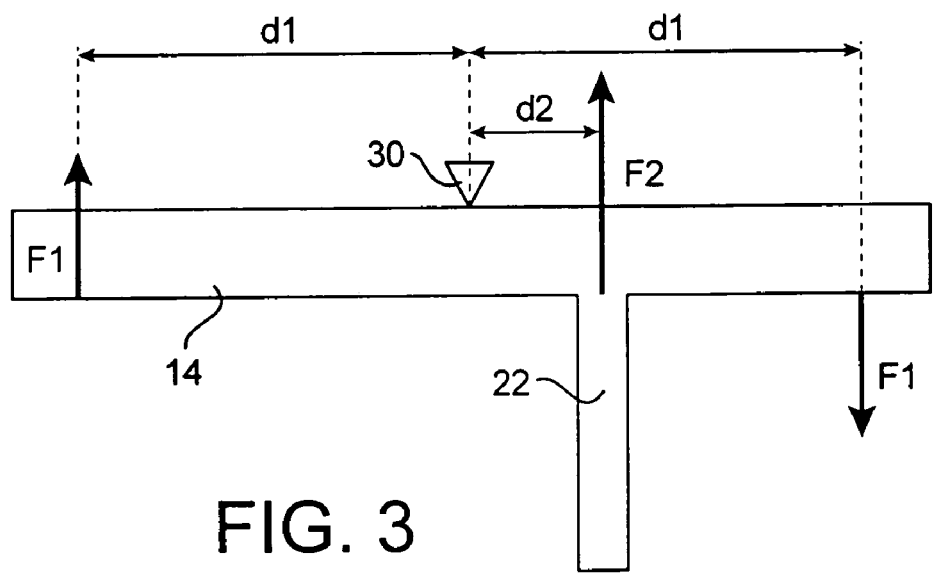
FIG. 3 diagrammatically shows the forces acting on a resonator of a gyrometer according to the invention.

As shown diagrammatically in FIG. 3, for a Coriolis force F1 applied to each mass located at a distance d1 from the torsion axis 30 located at the middle of the arm 14, a force F2 given by the equation $F2=2.(d1/d2).F1$ is applied to a resonator 22 fixed at a distance d2 from the torsion axis 30 of the arm 14. For a given geometry of a gyrometer 10 and a given rotation speed Ω, the frequency shift δω of the detection resonator 22 will increase as the lever arm defined by the connecting arm/bending arm assembly increases.

The excitation resonator 20 is symmetric to assure that the results are as reliable as possible, in other words in particular the two masses 12, 12', and the two connecting arms 14, 14' and the bending arms 16, 16' are identical. In the same way, the two masses 12, 12' are excited similarly in phase opposition.

Thus, with the device 10 according to FIG. 2, the resonant frequency ϖ of the resonator 22 detected during angular displacement Ω of the gyrometer 10, can be used to determine this angular displacement Ω, without the need to determine the relative displacement of the moving masses 12, 12' due to the Coriolis forces F1. Note that a frequency measurement can be made using only digital detection electronics, which is simpler than existing capacitive systems for detecting the shift.

This detection is also made in the plane of the device 10, which simplifies control over spacings between components.

Figure 4A:
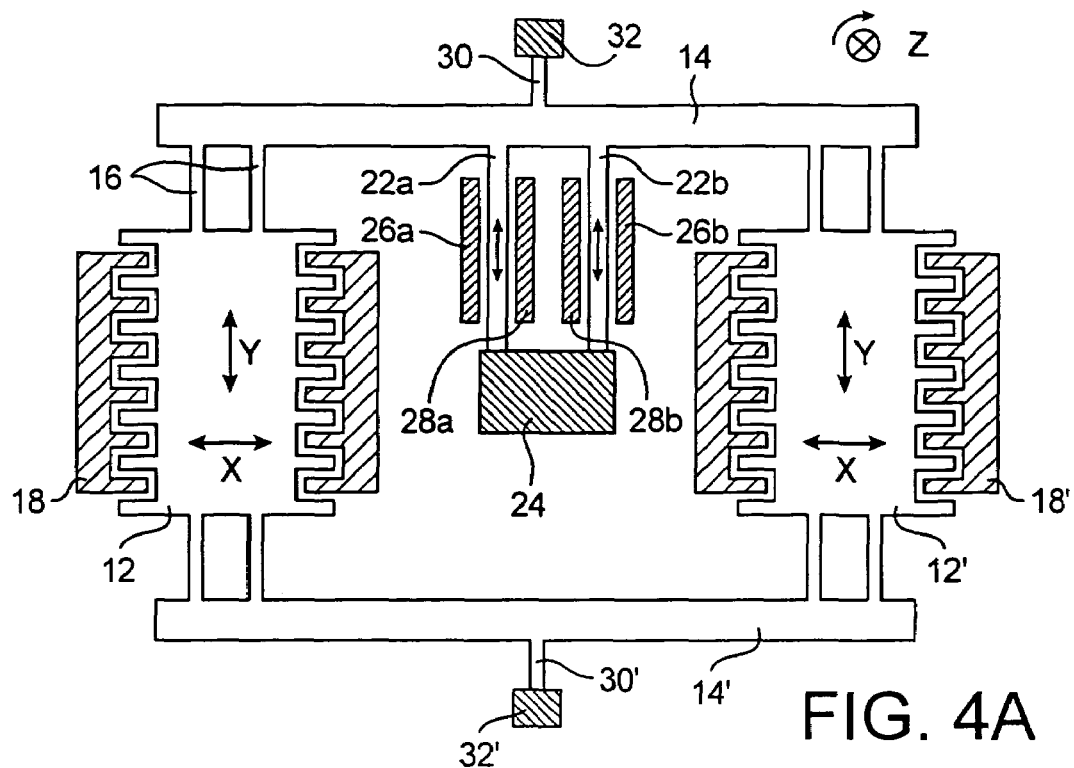
FIGS. 4A to 4D show different configurations for gyrometer detection resonators according to the invention.

The resonator shown in FIG. 2 is only illustrative; for example, as shown diagrammatically in FIG. 4A, it is possible to use two detection resonators 22a, 22b on the same connecting arm. The two resonators 22a, 22b have the same natural mode ϖ and are mounted to be symmetric about the torsion axis 30; this type of differential assembly increases the detection sensitivity, and eliminates the influence of some non-linear effects.

Figure 4B:
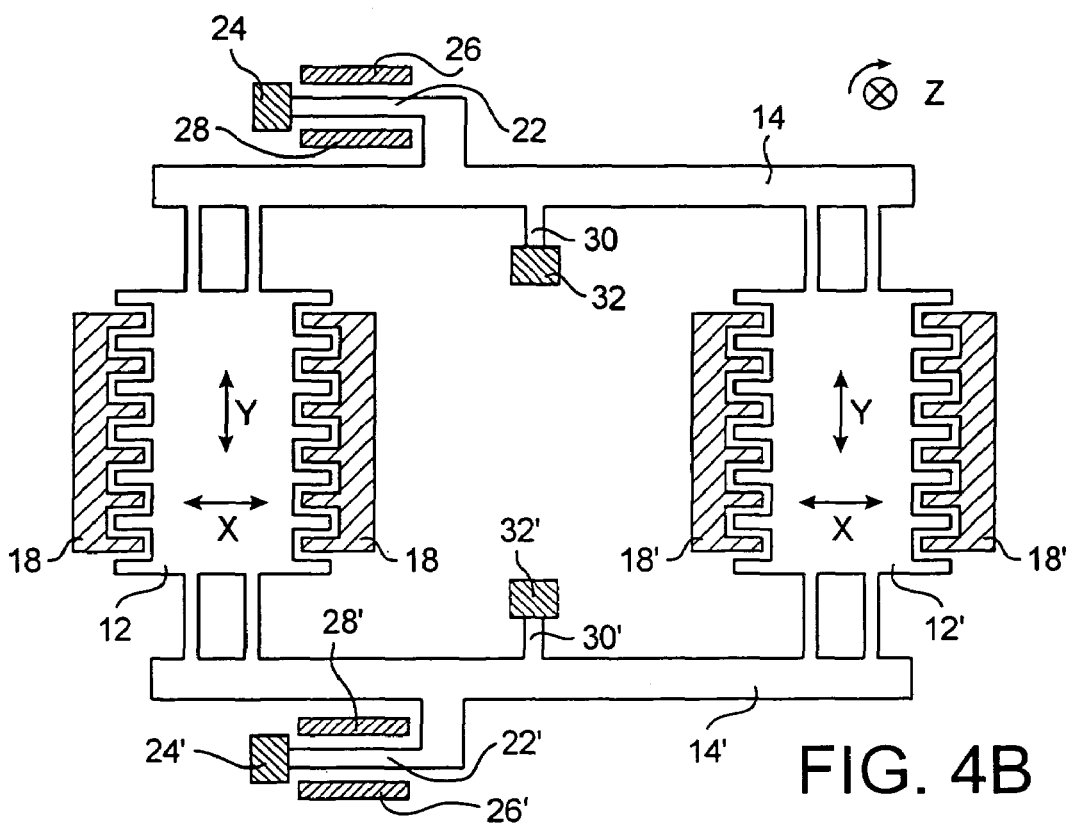

A differential assembly on the two arms 14, 14' would also be possible, with two resonators 22, 22' in this case located on the same side of an axis of the mobile device 20 defined by the two torsion axes 30, 30'; see FIG. 4B. Obviously, this assembly could be doubled up on each arm 14, 14'.

Note also that in the case shown in the diagram, the beams 22, 22' or more generally the detection resonators, are not necessarily parallel to the Y direction of the Coriolis force but may for example be parallel to the connecting arm 14, 14'.

Figure 4C:
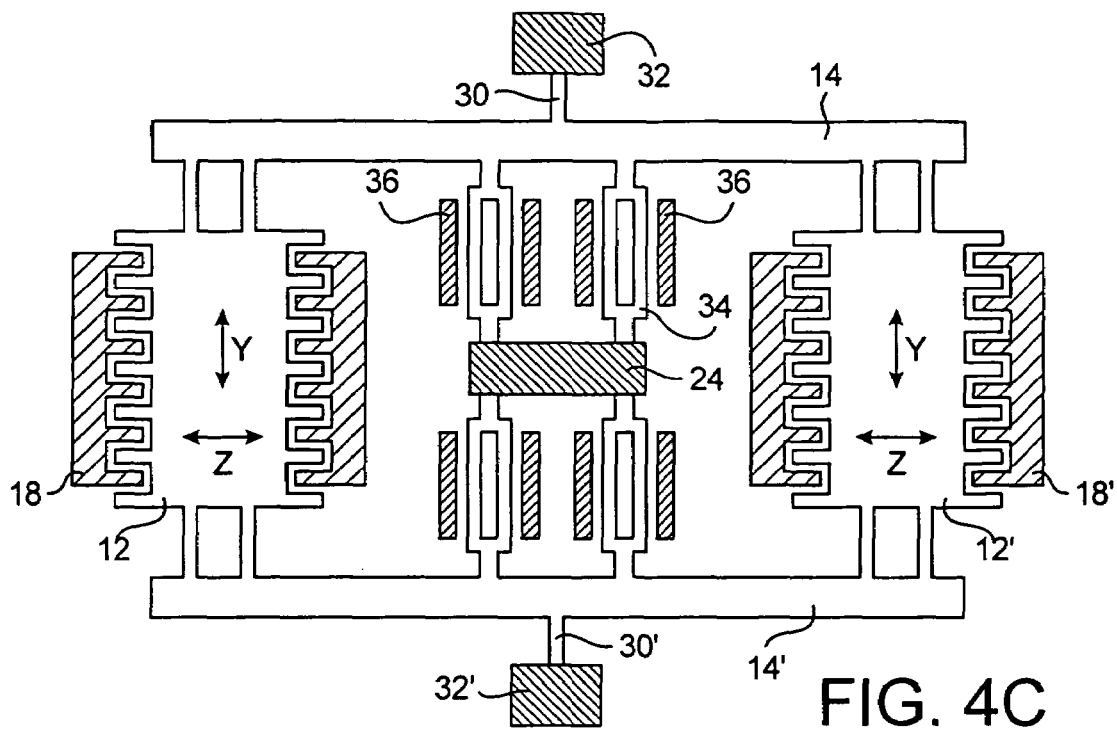

It is also possible to use tuning fork type resonators 34 instead of beam type resonators 22, on one or both arms (FIG. 4C). The use of tuning fork type resonators 34 can give higher quality factors, and therefore a gain in sensitivity and stability. Tuning fork type resonators 34 can also be excited by fixed capacitive electrodes 36 or by electromagnetic means.

Note that the anchor point 24 of the resonators is only shown diagrammatically as a single point for all resonators in FIG. 4C (for example see FIG. 4B).

It may be preferable for the resonant frequency of the masses 12, 12' to be close to the resonant frequency of the mobile device 20 composed of the assembly consisting of the masses 12, 12', the flexible means 16, 16' and the connecting arm 14, 14', about its torsion axis 30, 30', so that it can operate under optimum conditions. Furthermore, in order to increase the sensitivity, it is advantageous if the natural mode $\varpi$ of the detection resonator 22, 34 is significantly higher than the resonant frequency of the mobile device, or excitation resonator 20.

Apart from the simplification to the detection electronics, the gyrometer 10 according to the invention benefits from the strong sensitivity of the sensor 22, 34 inherent to frequency detection, and increased by the "lever arm" effect due to the torsion axis 30. The reduction in the distance d2 between the torsion axis 30 and the resonator 22, 34 also helps to increase the sensitivity.

Figure 4D:
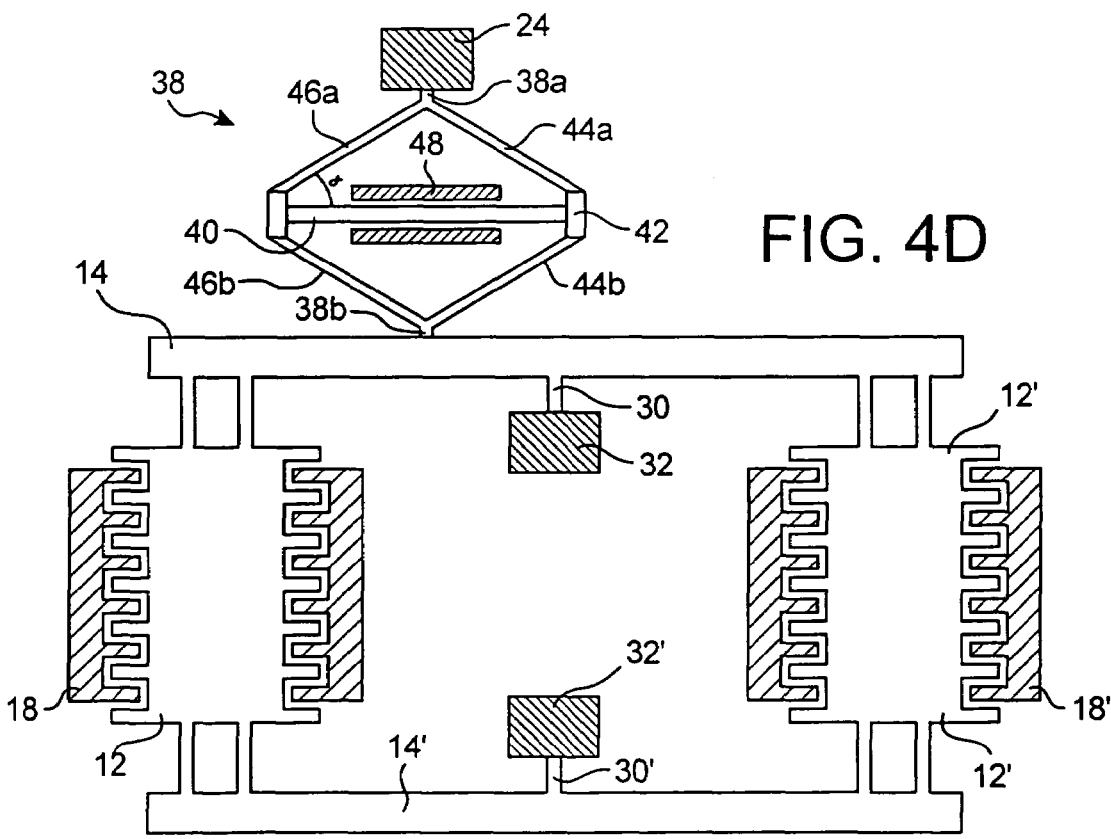

Another means for amplifying the sensitivity of the gyrometer 10 is shown in FIG. 4D; the detection system 38 is connected to an anchor point 24 at one end 38a and to the connecting arm 14 at the other end 38b. However, the two ends 38a, 38b of the resonant detection system 38 do not form the ends of the vibrating element 40 itself. Consequently, the vibrating beam 40 comprises two rigid terminal parts 42. Each terminal part 42 is connected by two rigid arms 44, 46 to the ends 38a, 38b of the detection system 38 by hinges. Advantageously, the articulated arms 44a, 44b, 46a and 46b are symmetric and form a diamond shape; they may be uniform or their thickness may vary.

In the example shown simply for illustrative purposes, the Coriolis force is perpendicular to the resonator 40; the Coriolis force causes a change in the distance between the ends 38a, 38b of the detection system 38. Since the arms 44, 46 are rigid, the angle α between the arms 44, 46 and the resonator 40, and the length of the vibrating beam 40 are modified, which causes a shift in the resonant frequency of the beam 40, which may for example be excited by fixed electrodes 48. The angle α can be varied to vary the amplification factor directly. It is clear that other configurations would be possible for the arms 44, 46 to achieve the same result.

Moreover, the sensitivity of the gyrometer 10 to transverse accelerations is low, and therefore the angular displacement Ω is determined better. Nor is there a coupling phenomenon between the excitation resonant frequency and the natural frequency $\varpi$ of the detection resonator 22, 34, 40, unlike the possible interference that can occur with capacitive detection.

Thus, the gyrometer according to the invention is very sensitive, stable and simple compared with the same type of existing gyrometers, due in particular to direct digital electronic processing. It is clear that the different embodiments shown in the figures can easily be combined.

The gyrometer 10 according to the invention can be made using any technique known in microtechnology, and more particularly in microelectronics. Advantageously, the substrate is made of silicon, particularly monocrystalline SOI type silicon, which increases the quality factor. The initial silicon wafer is a few hundred micrometers thick, for example 525 μm, and a thin layer of $SiO_2$, for example 0.4 μm thick, is deposited on the initial wafer and is itself covered with a thicker layer of monocrystalline silicon that will determine the thickness of elements of the gyrometer 10, for example of the order of 60 μm.

Machining of the gyrometer 10 consists of etching the required surface patterns, namely the shape of the elements of the first resonator 20 and the detection resonator 22, 34 and 40 of the gyrometer 10, in the upper silicon layer (for example by lithoetching) as far as the oxide layer. The subjacent oxide layer is then removed, for example by selective etching, except for anchor points 24, 32. The result is then a structure suspended on the substrate, held at a distance of the order of the thickness of the initial oxide layer by anchor points and free to be moved, particularly in vibration.

Naturally, other embodiments can also be envisaged.

The invention claimed is:

1. Gyrometer comprising:
   an excitation resonator, free to move in a plane, comprising two masses;
   means for connecting the two masses to each other;
   excitation means for putting the masses into movement in a first direction of the plane;
   at least one detection resonator connected to the means for connecting the two masses of the excitation resonator;
   means for exciting the at least one detection resonator; and
   means for measuring the frequency of a natural mode of the detection resonator.

2. Gyrometer according to claim 1, further comprising a substrate to which each resonator is connected through at least one anchor point.

3. Gyrometer according to claim 2, wherein the substrate is a microtechnological support, the gyrometer being monolithic.

4. Gyrometer according to claim 1, wherein means for putting the masses into movement is fixed capacitive combs.

5. Gyrometer according to claim 1, wherein the connecting means comprise first and second connecting arms parallel to the first movement direction of the masses, and connected to the masses through bending arms, such that the connecting arms are perpendicular to the Coriolis force generated by the movement of the masses in the first direction and a rotation of the first excitation resonator from an axis perpendicular to the plane.

6. Gyrometer according to claim 5, wherein each connection arm is connected to a torsion axis.

7. Gyrometer according to claim 6, wherein the at least one detection resonator comprising a detection resonator connected to a first connecting arm at a first distance from the torsion axis.

8. Gyrometer according to claim 7, wherein the at least one detection resonator further comprising another detection resonator connected to the second connecting arm at a second distance from the torsion axis.

9. Gyrometer according to claim 8, wherein the first and the second distances are equal, and wherein the detection resonators are connected to the first and second arms between the corresponding torsion axis and the same mass.

10. Gyrometer according to claim 9 wherein the detection resonators are chosen from among the vibrating arms or tuning fork-shaped resonators.

11. Gyrometer according to claim 7, wherein the detection resonator connected to a first connecting arm comprising two detection resonators connected to the first connecting arm symmetrically about the torsion axis.

12. Gyrometer according to claim 11, further comprising two detection resonators connected to the second connecting arm, symmetric about the torsion axis and at the first distance from the torsion axis.

13. Gyrometer according to claim 12, wherein the detection resonators are chosen from among the vibrating beams or tuning fork-shaped resonators.

14. Gyrometer according to claim 5, wherein the detection resonator is hinged about a rigid arm.

15. Gyrometer according to claim 1, wherein the at least one detection resonator is connected to means for amplifying a force exerted on them by the first excitation resonator.

16. Gyrometer according to claim 15, wherein the means for amplifying comprise rigid arms hinged about a resonant element.

17. Gyrometer according to claim 15, wherein the at least one detection resonator is chosen from among the vibrating beams or tuning fork-shaped resonators.

18. Gyrometer according to claim 1, comprising means for activating the at least one detection resonator.

19. Gyrometer according to claim 18, wherein the means for activating the second resonators is a capacitive type means.

20. Gyrometer according to claim 19, wherein the gyrometer is monolithic.

21. Gyrometer according to claim 1, wherein the natural mode of the detection resonator is higher than a resonant frequency of the excitation resonator.

22. Gyrometer comprising:

An excitation resonator, free to move in a plane, comprising two masses;

first and second connecting arms parallel to a first movement direction of the masses, and connected to the two masses;

excitation means for putting the masses into movement in the first direction of the plane;

at least one detection resonator connected to first and second connecting arms;

means of exciting the detection resonator, and means for measuring the frequency of a natural mode of the detection resonator.

23. Gyrometer comprising:

an excitation resonator, free to move in a plane, comprising two masses;

at least one connecting arm configured to connect the two masses to each other;

an excitation comb configured to put the masses into movement in a first direction of the plane;

at least one detection resonator connected to the at least one connecting arm configured to connect the two masses of the excitation resonator;

an excitation electrode configured to excite the at least one detection resonator; and a detection electrode configure to measure the frequency of a natural mode of the detection resonator.

* * * * *